June 26, 1962

O. C. J. WARD 3,040,729

MECHANISM FOR KEEPING CUTTING HEAD OF
MANSONRY SAW IN LEVEL POSITION

Filed Jan. 25, 1961

INVENTOR.
Orville C. J. Ward
BY
Paul E. Mullendore
ATTORNEY.

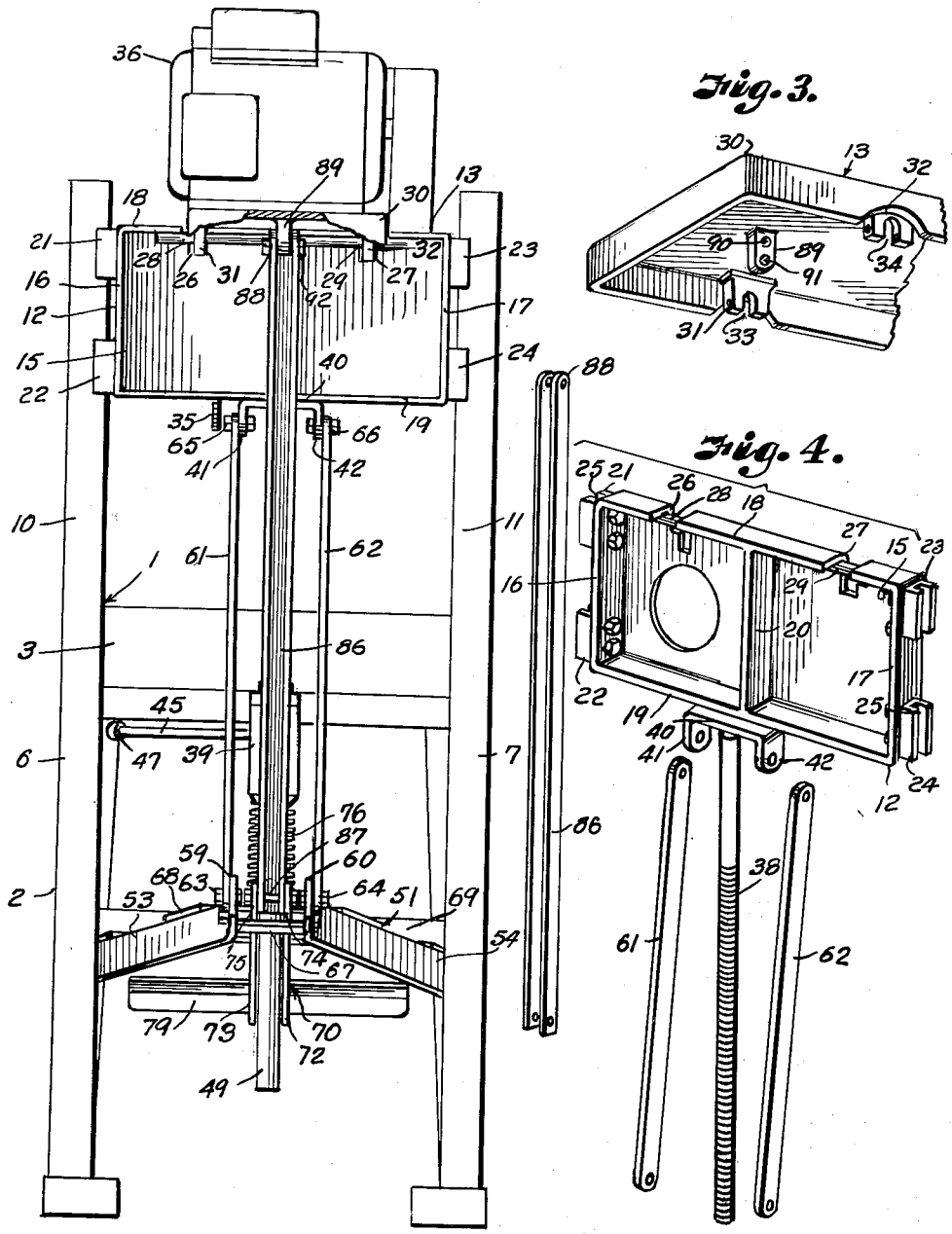

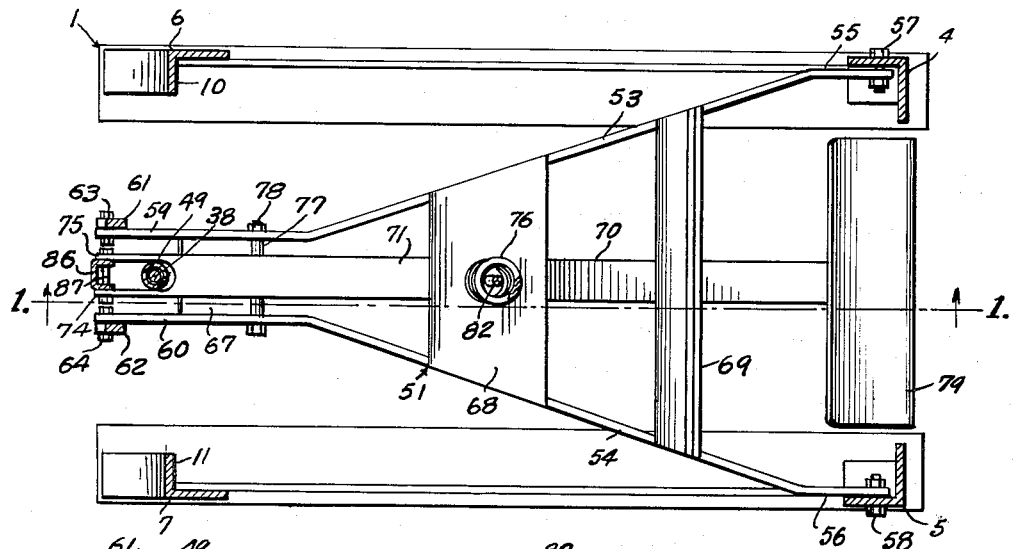
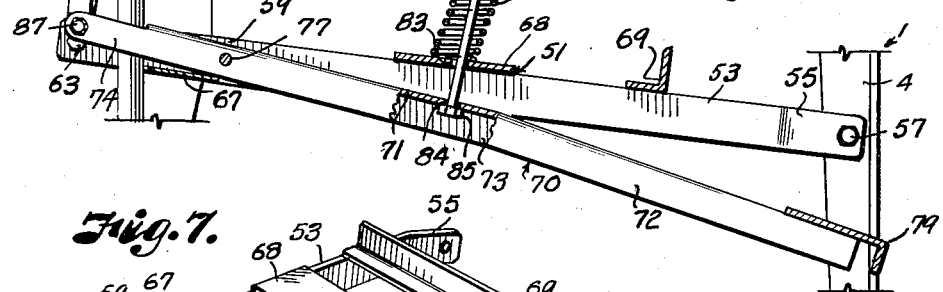
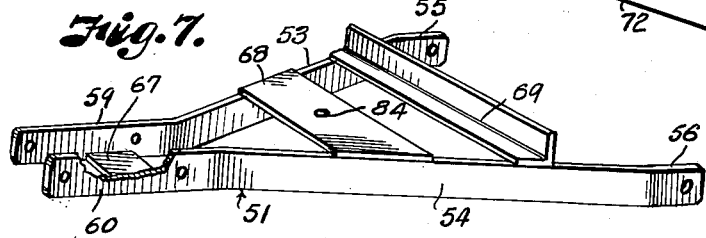
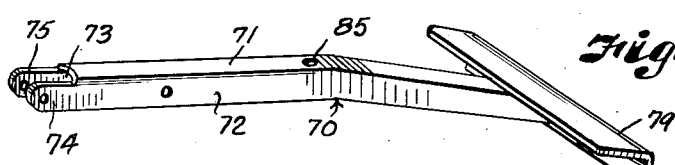

3,040,729
Patented June 26, 1962

1

3,040,729
MECHANISM FOR KEEPING CUTTING HEAD OF MASONRY SAW IN LEVEL POSITION
Orville C. J. Ward, Raytown, Mo., assignor to Robert G. Evans Company, Kansas City, Mo., a partnership
Filed Jan. 25, 1961, Ser. No. 84,918
7 Claims. (Cl. 125—13)

This invention relates to a cutting machine, particularly for cutting tile, brick, stone, and other masonry articles of different sizes and shapes.

Machines of this character usually include a workpiece carrier and a cutting head assembly swingable relative to the workpiece carrier by a foot operated lever to maintain the cutting element thereof in contact with the work during a cutting operation. In order to make efficient cuts through various sized workpieces, the pivotal axis on which the cutting head assembly swings must be raised or lowered according to the height of the workpiece. In many saws, this adjustment changes the angle of the cutting head and position of the foot lever, so that a further adjustment must be made between the foot lever and the cutting head to bring the cutting head back to the level position whenever the size of the workpiece is changed. There is also a chance for the cutting head to angle upward by yawing, thus exposing the blade of the cutting head to the operator's head, throat and body.

Prior to the present invention, several means have been proposed to maintain the cutting head level during raising and lowering thereof, but the resulting structures have been complicated and expensive to manufacture.

It is, therefore, the principal object of the present invention to provide a cutting machine with a pivoted cutting head assembly wherein the cutting head stays in a level position horizontally and parallel with the work supporting cart and to the material being cut throughout its range of movement, so that a cutting operation may be started without any further adjustment. It is also an object of the invention to accomplish this result with a simple and inexpensive structure.

Another object of the invention is to angle the cutting head slightly upwardly so that with a large diameter blade, for example, with a twenty inch blade, it is possible for the operator to start a cut in a high block, such as a twelve inch block standing on end beneath the blade surface.

In carrying out the present invention, the cutting head is pivoted on a carrier that is movable in an up and down direction on the frame of the machine by an actuating mechanism for adjusting the cutting head to the size of a workpiece.

The cutting head pivoting means comprises in effect two simple levers acting in conjunction to maintain a level position of the cutting head throughout its range of movement when adjusting the cutting head to the height of a workpiece. One of the levers is a swing lever and comprises a frame having fixed pivotal support at the front of the frame of the machine, and its swinging end is connected with the carriage by a link, so that the frame is lifted or lowered on its fixed pivot upon an up or down movement of the carriage. The other lever is the foot lever and is bodily carried by and pivotally mounted on the swing lever to position a pedal portion thereof in substantially transverse registry with the fixed pivot. The end of the foot lever opposite the pedal portion is connected by a simple link with the cutting head at a point offset from the pivotal axis. The two levers are resiliently connected together by a spring, so that both levers follow the carrier during adjustment of the cutting head without throwing the cutting head out of level or changing the location of the pedal portion of the foot lever.

2

In accomplishing the objects of the invention, I have provided an improved structure, the preferred form of which is illustrated in the accompanying drawings, wherein:

FIG. 2 is an end view of the machine.

FIG. 3 is a fragmentary view of the cutting head frame, particularly illustrating the relation of the lugs thereon for pivotally mounting the cutting head on the carrier and showing the ear to which the rocking link is connected.

FIG. 4 is a perspective view of the carrier for the cutting head, with the pivoting rod and links shown in spaced relation.

FIG. 5 is a horizontal section through the frame of the machine on the line 5—5 of FIG. 1.

FIG. 6 is a detailed view showing actuation of the foot lever on the swing lever, as when the foot lever is operated to swing the cutting head into contact with the work.

FIG. 7 is a perspective view of the swing lever.

FIG. 8 is a perspective view of the foot lever.

Figure 1:
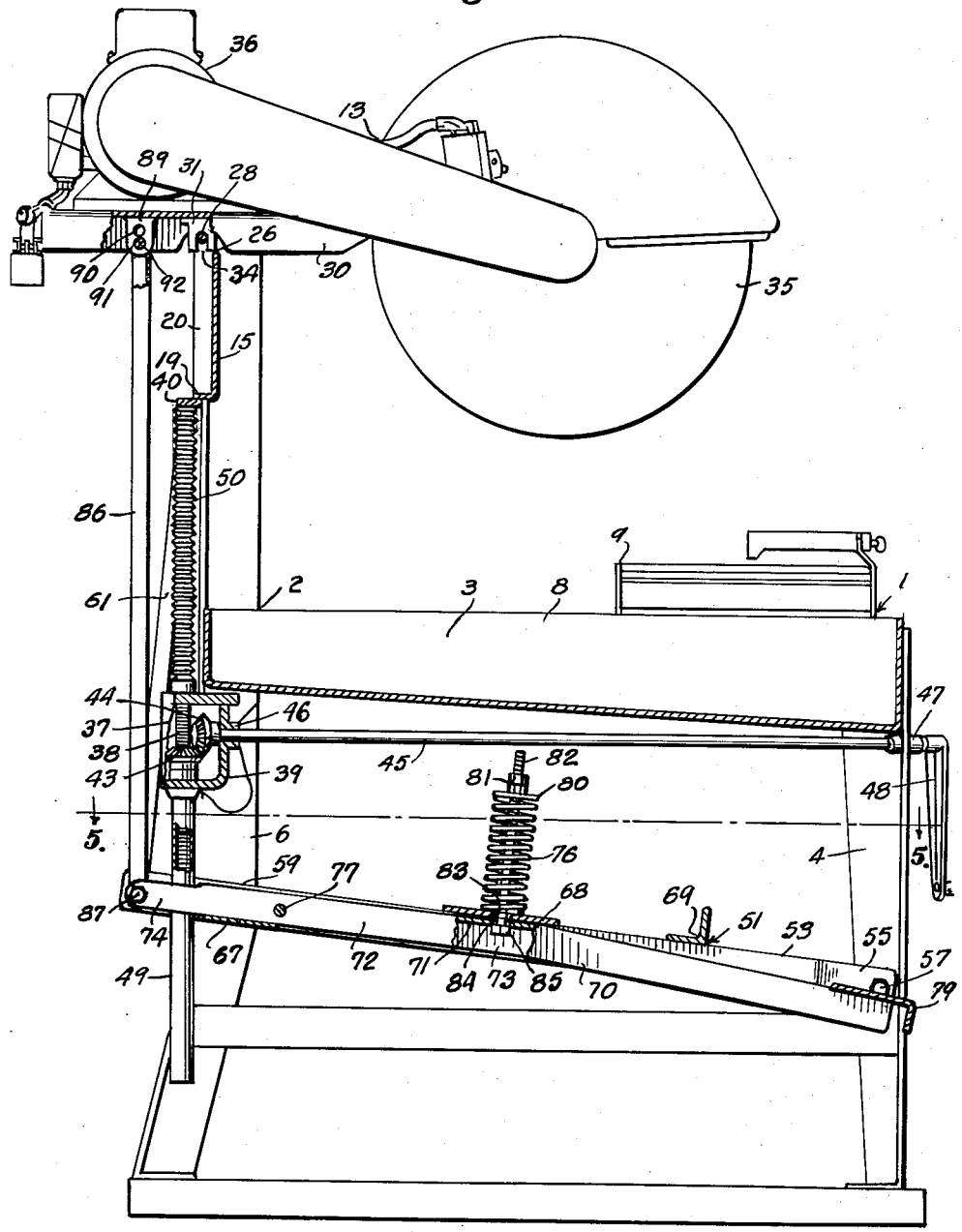
FIG. 1 is a vertical longitudinal section through a cutting machine embodying the improvements of the present invention, the section being taken on the line 1—1 of FIG. 5 and the cutting head being shown in side elevation.

Referring more in detail to the drawings:

1 designates a cutting machine constructed in accordance with the present invention and which includes a frame 2 having a rectangular pan shaped top 3 supported at the front and rear corners thereof on legs 4—5 and 6—7. The top 3 has sides 8 to form tracks on which a work carrying cart 9 (FIG. 1) is adapted to reciprocate as later described. The rear legs 6 and 7 extend upwardly from the pan 3 and have inwardly facing flanges 10 and 11 to provide vertical guides or tracks for a vertically reciprocable carriage 12 which pivotally supports a cutting head 13. The carriage 12 is best illustrated in FIG. 4 and comprises a rectangular plate portion 15 having inturned side flanges 16 and 17 at ends thereof and upper and lower flanges 18 and 19 that are interconnected midway thereof by a stiffening flange 20. Fixed to the side flanges of the carrier on the outer sides thereof are upper and lower blocks 21—22 and 23—24, each provided with grooves 25 to slidably engage therein the inturned flanges 10 and 11 of the rear legs 6—7 and on which the carriage 12 is adapted to be reciprocated for raising and lowering the cutting head 13. The upper flange 18 of the carrier has spaced apart notches 26 and 27 to expose fulcrums 28 and 29 on which the cutting head pivots as later described.

The cutting head 13 includes an elongated frame 30 arranged transversely of the carriage 15 and which has depending lugs 31 and 32 provided with downwardly opening notches 33 and 34 to straddle the fulcrums 28 and 29 on the carriage. The cutting head frame 30 extends forwardly from the carriage 15 and journaled at the forward end is a disk shaped cutting blade 35 that is suitably driven by a motor 36. The motor 36 is mounted on the rear end of the cutting head, as shown in FIG. 1 of the drawings.

The carrier is raised and lowered on the flanges 10 and 11 of the rear legs 6 and 7 to position the blade 35 in accordance with the height of the work to be cut, for example, a tile or other construction article that is placed upon the cart 9.

The actuating mechanism 37 (FIG. 1) for raising and lowering the carriage 15 includes a vertically positioned threaded rod 38 that is reciprocatingly supported in a gear box 39 mounted on the frame of the machine below the carriage and at a point below the rear end of the top 3, as best shown in FIG. 1. The upper end of the rod 38 bears against a bracket 40 that is attached to the lower flange 19 of the carriage and which has laterally disposed ears 41 and 42 at opposite sides of the threaded rod 38 for a purpose later described. Positioned in the gear box 39 is a fixed beveled gear 43 having an internally threaded bore for engaging the threads of the rod 38 to serve as a nut for raising and lowering the rod in the gear box, depending upon direction of rotation of the gear 43. The gear 43 is rotated by a beveled gear 44 fixed to the end of a shaft 45. The end of the shaft 45 that carries the gear 44 is journaled in the gear box in a bearing 46, and the opposite end is journaled in a bearing 47 carried by the front corner leg 4, as shown in FIG. 1. The shaft projects through the bearing 47 and carries an operating crank 48 by which the shaft is rotated to actuate the threaded rod in raising and lowering the cutting head on the frame to position the cutting head in accordance with the height of the workpiece carried on the cart 9. The lower end of the threaded rod 38 is contained in a tubular housing 49 which depends from the gear box, and the upper portion of the rod is protected by an accordion-like boot 50 that extends from the gear box 39 to the bracket 40, as shown in FIG. 1. The structure thus far described follows the construction of the Tucker Patent No. 2,726,651, issued December 13, 1955, and specifically forms no part of the present invention. However, with the construction shown in this patent the cutting head yaws upwardly and downwardly on its pivot during its adjustment, and it is necessary to make a further adjustment to bring it back to level position before beginning a cutting operation.

The cutting head of the present invention remains in level position and parallel with the cart 9 and with the work carried thereon, so that the cutting head is always ready for the operator to begin a cut.

In carrying out the present invention, the lever mechanism is always permanently in connection with the cutting head, and yet the cutting head cannot yaw up or down from its level position.

The lever mechanism comprises a swing lever 51 in the form of a frame in that it includes side bars 53 and 54 having ends 55 and 56 pivotally fixed to the side flanges of the front legs 4 and 5 by pivots such as bolts 57 and 58. The side bars converge inwardly toward the opposite ends which terminate in spaced apart parallel portions 59 and 60 on opposite sides of the housing 49 to, respectively, connect with the ears 41 and 42 of the bracket 40 by links 61 and 62. The lower ends of the links are pivotally connected with the parallel portions 59 and 60 by fastening devices such as bolts 63 and 64, while the upper ends are pivotally connected with the ears 41 and 42 by similar bolts 65 and 66, as best shown in FIG. 2. It is thus apparent that the frame will swing on its fixed pivots 57 and 58 on raising and lowering movement of the carriage. The parallel portions of the side bars are connected at their bottom edges by a transverse plate 67 and at a point intermediate the length thereof by a transverse plate 68 that are attached or suitably welded to the edges of the side bars, as best shown in FIG. 7. The rear portions of the side bars may be further stiffened by a transverse angle 69. It is obvious that the frame is a lever of the second class, in that it forms a pivotal support for a foot lever 70 which is a lever of the first class.

The foot lever 70 is shown as comprising a channel shaped member in that it has a web portion 71 and depending side flanges 72 and 73 terminating at one end in spaced apart ears 74 and 75 to accommodate the tubular housing of the threaded rod 38 therebetween when the foot lever is interposed between the side bars of the swing lever and between the upper and lower plates 68 and 67. The forward portion of the foot lever thus bears upon the plate 67 to be resiliently retained against the upper plate 68 by a coil spring 76. The foot lever is pivotally mounted betweeen he plates on a pivot pin 77 that extends transversely through the flanges 72 and 73 thereof and which has its ends extending through the side bar portions 53 and 54 of the lever frame and retained by fastening the lever frame and retained by fastening devices such as nuts 78. The opposite end of the foot lever extends downwardly from its contact point with the upper plate at a slight angle to carry a pedal 79 in substantial registry with the fixed pivots 57 and 58, so that as the levers are raised and lowered in adjustment of the cutting head, the position of the pedal will remain substantially fixed and in convenient position to be actuated by the foot of the operator under action of the spring 76. The spring 76 is seated upon the plate 68 and its opposite end abuts a washer 80 that is retained against stop nuts 81 on a bolt 82 that extends through openings 83 and 84 in the plate 68 and the web 71 of the foot lever, so that the head 85 thereon engages the under side of the web 7, whereby the action of the spring 76 resiliently retains the levers for movement as a unit by the links 61 and 62. The ears 74 and 75 of the foot lever are pivotally connected with the lower end of a link 86 by a fastening device such as a bolt 87. The link 86 is also of channel shaped construction and the upper end thereof terminates in spaced apart ears 88 to accommodate a depending lug 89 located on the elongated frame in offset relation with the spaced apart lugs 31 and 32. The lug 89 has upper and lower openings 90 and 91 to connect with the ears of the link by a fastening device such as a bolt 92 that is contained in one or the other of the openings to hold the cutting head in level position or to give a slight upward tilt thereto, as when the bolt is extended through the upper of the openings. It is thus obvious that the link 86 cooperates with the links 61 and 62 to hold the cutting head in substantially level position during raising and lowering thereof, since the foot lever 70 is retained from pivoting with respect to the swing frame by action of the spring 76.

In using the machine constructed as described for cutting a workpiece, for example, a tile used in building construction, the tile is placed in position on the cart 9 and the cutting head 13 is raised or lowered in level position to bring the cutting blade 35 into position according to the height of the tile. This adjustment is made by rotating the crank 48 in the proper direction to raise or lower the cutting head through the gears 43 and 44 and the threaded rod 38. During this adjustment, the pivot member 77 for the foot lever 70 being carried by the swing lever 51 is raised or lowered through its connection with the carriage 15 by the links 61 and 62. When the cutting head has been adjusted to the height of the tile, it is in level position and may be pivoted into cutting contact therewith. This is acomplished by the operator placing his foot on the pedal 79 and pressing downwardly thereon to swing the foot lever about the pivotal connection 77 against action of the spring 76, as shown in FIG. 6. This rocking movement of the foot lever has no effect upon the swing lever, because the swinging end thereof is supported from the carriage 15 by the links 61 and 62. Therefore, the foot lever 70 rocks about its pivot 77 to raise the link 86 and rock the cutting head downwardly on the fulcrums 28 and 29. Upon release of the foot pressure on the pedal, the spring 76 returns the foot lever to its normal position with relation to the lever frame and brings the cutting head back to level position, with the pedal portion 79 of the foot lever returning to its position in transverse alignment with the pivotal axis of the swing lever.

If a smaller tile is placed on the cart, it is necessary to lower the cutting head, and this is readily effected by rotating the crank 48 in the proper direction, but during this movement the cutting head remains constantly level. Also, the pedal 79 of the foot lever 70 retains its position so that it is again readily engaged by the foot of the operator without any further adjustment.

When a large blade is used in the cutting head, for example a twenty inch blade, and large concrete blocks are to be cut when standing on end on the cart 9, the entire cutting head may be tilted slightly by changing the position of the pivot pin 92 from the lower hole to the upper hole 90 in the lug 89. This gives a sufficient upward tilt for the saw blade to start a cut on a larger sized block.

What I claim and desire to secure by Letters Patent is:

1. A machine for cutting workpieces such as tile and the like and which includes a main frame for supporting the workpiece to be cut, a carriage movable vertically on the main frame, a cutting head having pivotal support on the carriage, means for raising and lowering the carriage to adjust the cutting head in accordance with the height of the workpiece, and mechanism for keeping said cutting head in level position responsive to movement of the carriage and for pivoting the cutting head on the carriage to bring the cutting head into cutting contact with the work, said mechanism comprising a foot lever having a pedal portion, a swing frame, pivot means on the main frame for pivotally fixing the swing frame, means for pivotal mounting of the foot lever on the swing frame with said pedal portion in substantial registry with the pivot means for said swing frame, link means connecting the swing frame with the carriage, means for resiliently connecting the foot lever with the swing frame for moving the foot lever therewith, and a link connecting the foot lever with the cutting head to maintain said level position of the cutting head and to pivot said cutting head into contact with the workpiece when the foot of the operator presses upon said pedal portion of the foot lever.

2. A machine for cutting workpieces such as tile and the like and which includes a main frame for supporting the workpiece to be cut, a carriage movable vertically on the main frame, a cutting head having pivotal support on the carriage, means for raising and lowering the carriage to adjust the cutting head in accordance with the height of the workpiece, and mechanism for retaining said cutting head in level position throughout the movement of the carriage and for pivoting the cutting head on the carriage to bring the cutting head into cutting contact with the work, said mechanism comprising a foot lever having a pedal portion, a swing frame pivotally mounted upon the main frame, means for pivotally mounting the foot lever on the swing frame with said pedal portion in substantial registry with the pivotal mounting of said swing frame, link means connecting the swing frame with the carriage to swing the swing frame, means for resiliently connecting the foot lever with the swing frame for bodily moving the foot lever therewith, and a link connecting the foot pedal with the cutting head to maintain said level position of the cutting head and to pivot said cutting head into contact with the workpiece by pressure applied upon said pedal portion of the foot lever.

3. A machine for cutting workpieces such as tile and the like and which includes a main frame for supporting a workpiece to be cut, a carriage movable vertically on the main frame, a cutting head having pivotal support on the carriage, means for raising and lowering the carriage to adjust the cutting head to the height of the workpiece, and mechanism for retaining said cutting head in level position throughout the movement of the carriage and for pivoting the cutting head on the carriage to bring the cutting head into cutting contact with the work, said mechanism comprising a foot lever having a pedal portion, a swing frame having spaced apart arms, means on the main frame for pivotally fixing one end of said arms to the main frame, said arms converging toward their opposite ends to accommodate the pedal lever therebetween with said pedal portion in registry with said pivot means, means for pivotally mounting the foot lever between said converging ends, a plate connecting the converging ends of said arms below the foot lever and forwardly of the pivot point of said foot lever, a plate connecting the arms above the foot lever on the opposite side of said pivot point, link means connecting the swing frame with the carriage to actuate the swing frame with movement of the carriage, resilient means for yieldingly retaining the foot lever in contact with said plates, and a link connecting the foot lever with the cutting head to maintain said level position of the cutting head during movement of the carriage and to pivot said cutting head into contact with the workpiece when the foot of an operator presses upon said pedal portion of the foot lever.

4. A machine for cutting workpieces such as tile and the like and which includes a main frame for supporting the workpiece to be cut, a carriage movable vertically on the main frame, a cutting head having pivotal support on the carriage, means for raising and lowering the carriage to adjust the cutting head to the height of the workpiece, and mechanism for retaining said cutting head in level position throughout the movement of the carriage and for pivoting the cutting head on the carriage to bring the cutting head into cutting contact with the work, said mechanism comprising a foot lever having a pedal portion, a swing frame having spaced apart arms, means on the main frame for pivotally fixing one end of said arms to the main frame, said arms converging toward their opposite ends to accommodate the pedal lever therebetween with said pedal portion in registry with said pivot means, means for pivotal mounting of the foot lever between said converging ends, a plate connecting the converging ends of said arms below the foot lever, an upper plate connecting the arms above the foot lever, link means connecting the swing frame with the carriage to support and swing the swing frame, a bolt fixed to the foot lever and extending through said upper plate, a spring sleeved on said bolt and seated on said upper plate, means on the bolt for compressing the spring to normally retain the foot lever in contact with said plates, and a link connecting the foot lever with the cutting head to maintain said level position of the cutting head and to pivot said cutting head into contact with the workpiece when the foot of the operator presses upon said pedal portion of the foot lever.

5. A machine for cutting workpieces such as tile and the like and which includes a main frame for supporting a workpiece to be cut, a carriage movable vertically on the main frame, a cutting head having pivotal support on the carriage, means for raising and lowering the carriage to adjust the cutting head to the height of the workpiece, and mechanism for retaining said cutting head in level position throughout the movement of the carriage and for pivoting the cutting head on the carriage to bring the cutting head into cutting contact with the work, said mechanism comprising a foot lever having a pedal portion, a swing frame having spaced apart arms, means on the main frame for pivotally fixing one end of said arms to the main frame, said arms converging toward their opposite ends and terminating in substantially parallel portions to accommodate the pedal lever therebetween with said pedal portion in registry with said pivot means, means for pivotally mounting the foot lever between said converging ends, a plate connecting the converging ends of said arms below the foot lever and forwardly of the pivot point of said foot lever, a plate connecting the arms above the foot lever on the opposite side of said pivot point, links pivotally connecting said parallel portions of the arms with the carriage to actuate the swing frame with movement of the carriage, resilient means for yieldingly retaining the foot lever in contact with said plates, and a link pivotally connected with the foot lever and extending upwardly between the first named links and having pivotal connection with the cutting head to maintain said level position of the cutting head during movement of the carriage and to pivot said cutting head into contact with the workpiece when the foot of an operator presses upon said pedal portion of the foot lever.

6. A machine for cutting workpieces such as tile and the like and which includes a main frame for supporting the workpiece to be cut, a carriage movable vertically on the main frame, a cutting head having pivotal support on the carriage, means directly connected with the carriage for raising and lowering the carriage to adjust the cutting head in accordance with the height of the workpiece, and mechanism for keeping said cutting head in level position during vertical movement of the carriage, said mechanism including a swing lever independent of the raising and lowering means and having one end pivoted to a part of the main frame opposite the carriage and having the other end extending under the carriage, link means connecting the said other end of the swing lever with the carriage, a foot lever, means fulcruming the foot lever on the swing lever, means connecting the foot lever with the cutting head, and means for resiliently retaining said levers normally in fixed relative relation to maintain level position of the cutting head during said vertical movement of the carriage, said resilient means being yieldable upon depressing the foot lever to pivot the cutting head from level position on the carriage when a cut is to be made.

7. A machine for cutting workpieces such as tile and the like and which includes a main frame for supporting the workpiece to be cut, a carriage movable vertically on the main frame, a cutting head having pivotal support on the carriage, means directly connected with the carriage for raising and lowering the carriage to adjust the cutting head in accordance with the height of the workpiece, and mechanism for keeping said cutting head in level position during movement of the carriage, said mechanism including a swing lever independent of the raising and lowering means and having one end pivoted to a part of the main frame opposite the carriage and having the other end extending under the carriage, a link connecting the said other end of the swing lever with the carriage, a foot lever coextensive with the swing lever, means fulcruming the foot lever on the swing lever near the end thereof remote from said pivoted end of the swing lever to provide a short arm and a relatively long arm terminating in registry with said pivoted end of the swing lever, a link connecting said short arm of the foot lever with the cutting head, and means for resiliently retaining said levers normally in coextensive relation with the long arm remaining in registry with said pivoted end of the swing lever to maintain level position of the cutting head during vertical movement of the carriage, said resilient means being yieldable upon depressing of the long arm of the foot lever from said registering position to pivot the cutting head from level position of the carriage.

References Cited in the file of this patent

UNITED STATES PATENTS

| | | |
|---|---|---|
| 2,726,651 | Tucker | Dec. 13, 1955 |
| 2,863,440 | Harclerode | Dec. 9, 1958 |
| 2,998,812 | Cooper | Sept. 5, 1961 |

FOREIGN PATENTS

| | | |
|---|---|---|
| 1,105,322 | France | June 29, 1955 |